United States Patent

Schalk

Patent Number: 5,826,613
Date of Patent: Oct. 27, 1998

[54] FLOW CONTROL VALVE

[75] Inventor: Adelbert Schalk, Wutoschingen-Horheim, Germany

[73] Assignee: Georg Fischer Rohrleitungssysteme AG, Switzerland

[21] Appl. No.: 807,251

[22] Filed: Feb. 28, 1997

Related U.S. Application Data

[63] Continuation of Ser. No. 374,633, filed as PCT/CH94/00090 May 17, 1994, abandoned.

[30] Foreign Application Priority Data

May 19, 1993 [CH] Switzerland ............ 01 524/93

[51] Int. Cl.$^6$ .............. F16K 1/12; F16K 3/26; F16K 37/00
[52] U.S. Cl. .............. 137/219; 137/312; 137/554; 251/63.5
[58] Field of Search .............. 137/219, 312, 137/554, 556; 251/63.5

[56] References Cited

U.S. PATENT DOCUMENTS

| | | | |
|---|---|---|---|
| 1,477,722 | 12/1923 | Slattery | 137/219 X |
| 2,416,787 | 3/1947 | White | 137/219 X |
| 2,765,181 | 10/1956 | Butterfield | 251/282 X |
| 2,996,074 | 8/1961 | Page et al. | 137/220 |
| 3,253,608 | 5/1966 | Davis | 137/220 |
| 3,566,907 | 3/1971 | Sime | 137/554 X |
| 3,784,156 | 1/1974 | Paetzel et al. | 137/219 X |
| 3,824,033 | 7/1974 | Chacour | 137/219 X |
| 3,916,946 | 11/1975 | Motzer | 137/554 X |
| 4,077,425 | 3/1978 | Drori | 137/219 |
| 4,117,859 | 10/1978 | Illy | 137/219 |
| 4,137,933 | 2/1979 | Culpepper | 137/219 |
| 4,436,108 | 3/1984 | Ellsworth | 137/312 X |
| 4,798,223 | 1/1989 | Mitchell et al. | 137/554 X |

FOREIGN PATENT DOCUMENTS

| | | | |
|---|---|---|---|
| 0566543 | 10/1993 | European Pat. Off. | 137/219 |
| 2115543 | 10/1971 | Germany | 251/340 |
| 917929 | 2/1963 | United Kingdom | 137/219 |

Primary Examiner—Gerald A. Michalsky
Attorney, Agent, or Firm—Bachman & LaPointe, P.C.

[57] ABSTRACT

A valve which allows for two-directional flow comprises a housing defining an axial flow channel; a flow control body disposed within the axial flow channel, the flow control body having a recess for receiving flow impact surfaces which allow for two directional flow; a closure member disposed within the axial flow channel; and drive means for displacing the closure member in an axial direction for selectively sealing and unsealing the drive means on the flow control body.

6 Claims, 3 Drawing Sheets

FLOW CONTROL VALVE

This is a continuation of application Ser. No. 08/374,633 filed on Jan. 18, 1995, now abandoned, which was the National Stage of International Application PCT/CH94/00090 filed on May 17, 1994 and which designated the U.S.

BACKGROUND OF THE INVENTION

The present invention relates to a flow control valve for two directional flow.

PRIOR ART

A valve known from Federal Republic of Germany C3-2318165 is formed as a scrapable filling fitting capable of only one direction of flow. Furthermore, the development and arrangement of the flow body is very expensive.

The principle object of the present invention is to create a valve for arrangement in a pipeline which is capable of both directions of flow and has small outside dimensions. Furthermore, the valve should be capable of diversified use and still be reliably operable after a long period of operation.

SUMMARY OF THE INVENTION

The foregoing object is achieved by the present invention wherein a valve which allows for two-directional flow and comprises a housing defining an axial flow channel; a flow control body disposed within the axial flow channel, the flow control body having opposed recesses for receiving opposed flow impact surfaces which allow for two directional flow; a closure member disposed within the axial flow channel; and drive means for displacing the closure member in an axial direction for selectively sealing and unsealing the drive means on the flow control body. Particularly advantageous further developments of the invention are contained in the dependent claims.

BRIEF DESCRIPTION OF THE DRAWINGS

Embodiments of the invention are shown in the accompanying drawing and are described below. In the drawing.

DETAILED DESCRIPTION

Figure 1:
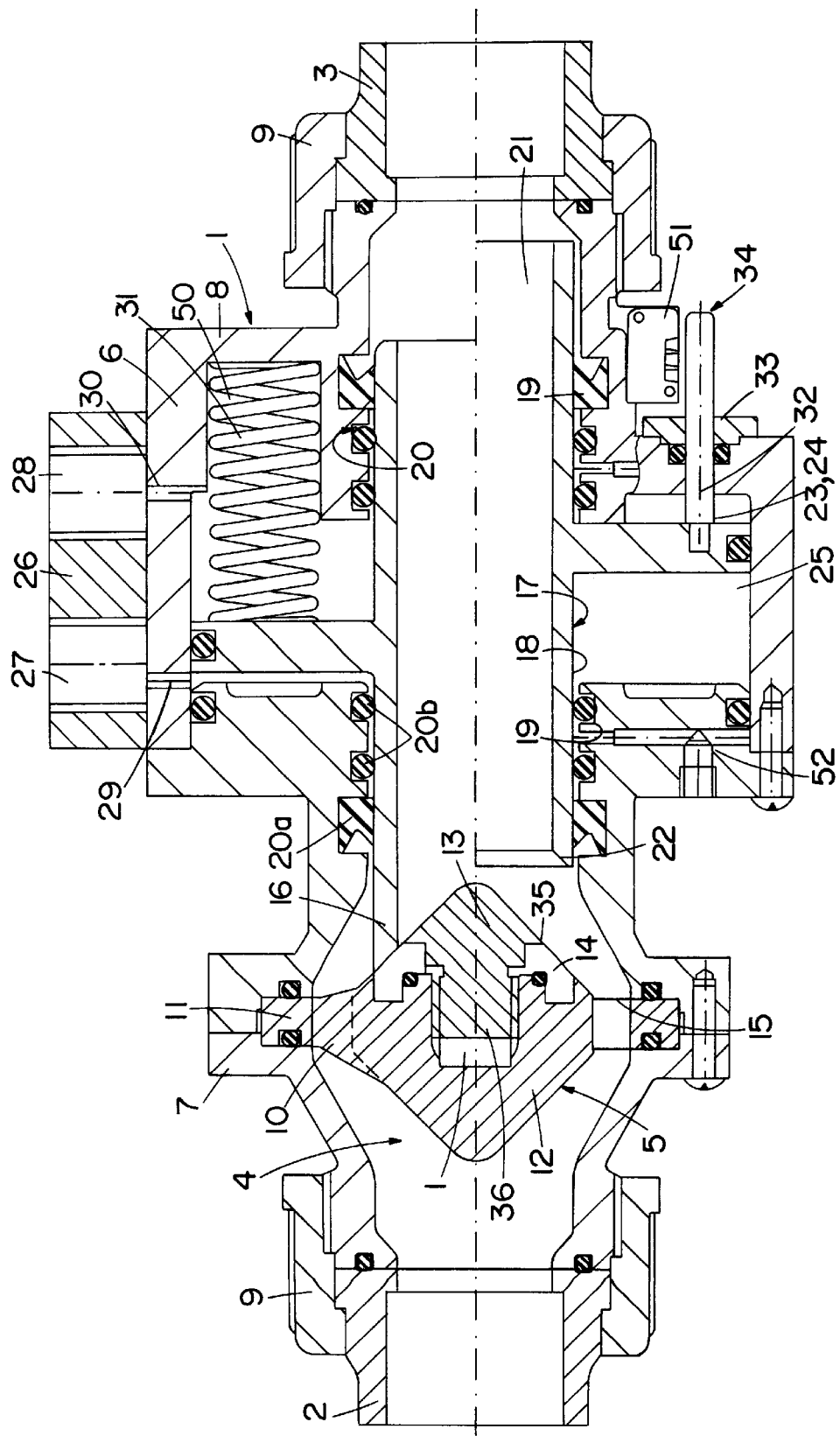
FIG. 1 is a longitudinal section through the valve.

The housing 1 of the valve has a flow-through channel 4 which is coaxial to the adjoining pipelines 2 and 3 and in which a flow body 5 is arranged. The housing 1 consists of a middle part 6, the flow body 5 and connecting parts 7 and 8 flanged on both sides on it, with fastening means 9 for the pipelines 2 and 3. As shown in FIG. 1, the connecting part 8 is formed in one piece with the middle part 6.

The flow body 5 is connected by arms 10 to an outer ring 11 which is arranged clamped concentrically fast between the connecting part 7 and the middle part 6 of the housing 1, resulting in an arrangement of the flow body 5 which is coaxial to the flow channel 4. The flow body 5 can also be firmly attached to the housing 1 and the middle part 6 or the connecting part 7, which is effected by single-piece manufacture.

The flow channel 4 is enlarged in diameter in the region of the flow body 5 and is formed in a manner favorable for flow in both directions.

The flow body 5 is also formed in a manner favorable for flow in both directions by the preferably conical shape of the facing flow-impact parts 12 and 13, the cross section of the arms 10 being also formed in a manner favorable to flow. Flow impact part 13 has a conical wall surface 35 and a stem portion 36 received in a recess 37 provided in the flow body 5. By the shape of the conical wall 35 of the flow-impact part 13, a desired flow characteristic can be determined.

The flow body 5 has a conical sealing surface 14 provided with a packing 15, said sealing surface together with a closure part 16 adjoining it in front forming the cutoff for the flow of fluid.

In a variant embodiment, which is not shown in the drawing, a cylindrical sealing surface can be arranged on the outer circumference of the flow body 5, said surface forming the cutoff for the flow of fluid together with the inner surface of the closure part which can be pushed onto the sealing surface.

The closure part 16 is formed as a slide sleeve 17 and is displaceably supported on both sides with its outer circumference 18 in the bearing part 19 of the housing middle part 6 and of the connecting part 8, provided with a sealing arrangement 20.

The sealing arrangement 20 preferably has a lip seal 20a which serves for the sealing-off of the flowing fluid and two seals 20b formed, for instance, as round rubber rings for the sealing-off of the control fluid. Between each of the two seals 20b there is a leakage hole 52 which prevents the control fluid from emerging into the flow channel 4 or conversely the flow fluid from entering into the cylindrical space 25. This is furthermore assured also for the entire life of the seals.

A continuous opening 21 of the slide sleeve 17 is part of the flow channel 4, its end surface 22 at one end forming the flow cut-off together with the seal 15 on the conical sealing surface 14. A disk-shaped part of the slide sleeve 17 forms a piston 23 of a reciprocating drive 24, the cylinder chamber 25 of the reciprocating drive 24 being arranged coaxial to the flow channel 4 in the middle part 6 of the housing 1.

On the housing 1 there is arranged a connecting part 26 with connectors 27, 28 for a pneumatic or hydraulic pressure fluid, the connectors 27, 28 being connected by parts 29, 30, with the corresponding annular spaces on the two sides of the cylindrical chamber 25.

In the embodiment shown in FIG. 1, the opening movement of the closure part 16 is produced by a pressure fluid through the connector 27 and the closing movement by means of springs 31 arranged in the cylinder chamber 25. By the feeding of pressure fluid via the connectors 27, 28, the opening and closing movements can be effected by the pressure fluid, or there is also the possibility of arranging the springs 31 on the other side of the piston 23 so that the opening movement is effected by spring force. In addition to the arrangement shown of several springs 30 distributed circumferentially in the cylinder chamber 25, one or more springs can also be arranged coaxially to each other and to the flow channel (see also FIG. 2).

Preferably, two radially opposite spring packages which have three springs each can, for instance, be arranged, they being supported and guided in recesses 50 in the housing 6 and the connecting part 8 respectively.

On the piston 23 there is fastened a rod 32 which, in the open position of the valve, extends out of a bore 33 in the housing 1, while in the closed position its end lies within the bore 33, so that this rod forms a valve-position indicator 34.

The rod 33 together with an electrical, optical or pneumatic switch 51 arranged on the housing can form the valve-position indicator 34, whereby the position of the valve is visible in a remote display or can be noted as report.

Due to its compact construction, the valve can also be arranged between the pipelines in the event of tight space conditions.

The valve is preferably used for pipeline systems of plastic, and particularly also for aggressive and corrosive flow fluids, at least the parts coming into contact with the flow fluid, such as housing, flow body, closure part with piston and connecting parts, are made of plastic, for instance of polyvinylchloride, polypropylene, polybutylene, polyethylene, polyvinylidene fluoride, polyamide or polytetrafluorethylene.

Another advantage of the valve resides in the fact that only slight forces of displacement are necessary for the opening and closing movement, since only slight forces act on the closure part due to the pressure of the flow fluid. The pressure necessary for the control of the closure part 16 is practically independent of the pressure of the fluid in the pipeline.

The valve described can be used not only as shut-off valve but also as flow regulating valve, in which case, any desired position between open and closed position of the closure part can be produced by the reciprocating drive, so that regulation of the quantity of flow is possible.

For this purpose, the valve is provided with a position sensor which transmits the instantaneous position of the closure part, for instance on the valve-position indicator 34 or directly on the piston 23, by electric signals to a control unit in a control circuit, the measured data being compared with predetermined data and the control effecting a corresponding displacement of the reciprocating drive via a solenoid valve.

When used as flow control valve, the nature of the flow characteristic is furthermore an advantage, it being of practically constant slope between 5% and 100% of the stroke. By a suitable selection of the shape of the conical wall 35, the flow characteristic can be optimized for the corresponding control.

Figure 2:
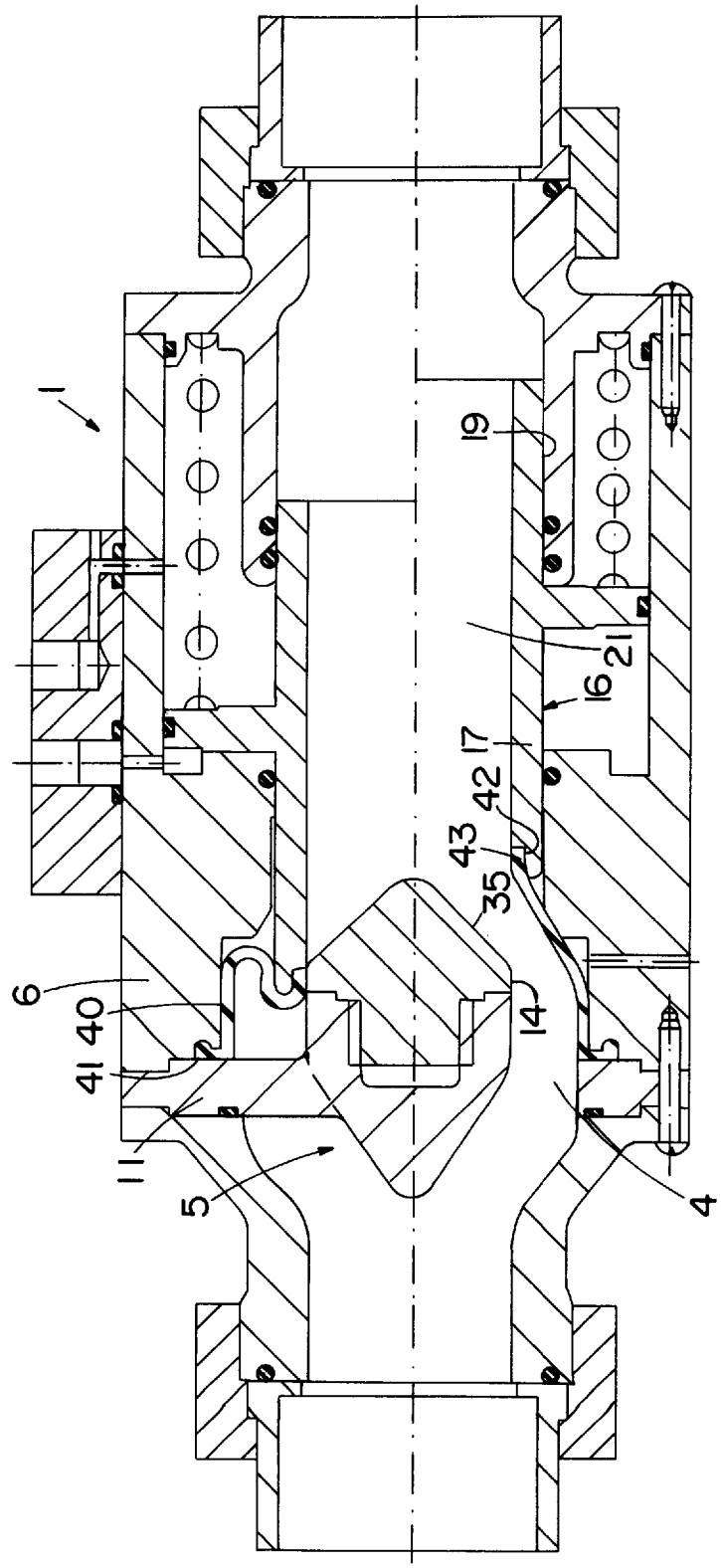
FIG. 2 is a variant embodiment of the valve shown in FIG. 1.

FIG. 2 shows a variant embodiment of the valve having a cuff diaphragm 40 arranged between the housing 1 and the closure part 16.

The cuff diaphragm 40 has at one end a flange part 41 by means of which it is clamped between the middle part 6 of the housing 1 and the outer ring 11 of the flow body 5 in a manner which seals it off from the outside. The other end is pressed into a groove 42 on the inner circumference of the slide sleeve 17 or firmly attached to it.

On the inner circumference of this end of the cuff diaphragm 40 there is a sealing bead 43 which, in closed position of the closure part 16, together with the cylindrical sealing surface 14 of the flow body 5, forms the tight cut-off of the flow. The cuff diaphragm 40 can also be applied tightly against the conical wall surface 35 of the flow-impact part.

By the arrangement and development of the cuff diaphragm 40, a further flow-favoring course of the flow channel 4 between the housing 1 and the closure part 16 is established in open position as well as in intermediate positions upon use as flow-control valve.

By the development of the valve described in connection with FIG. 2, its flow channel 4 has no sharp edges or undercuts, so that no dead spaces in which particles could deposit are present. The valve has particularly favorably flow conditions.

Figure 3:
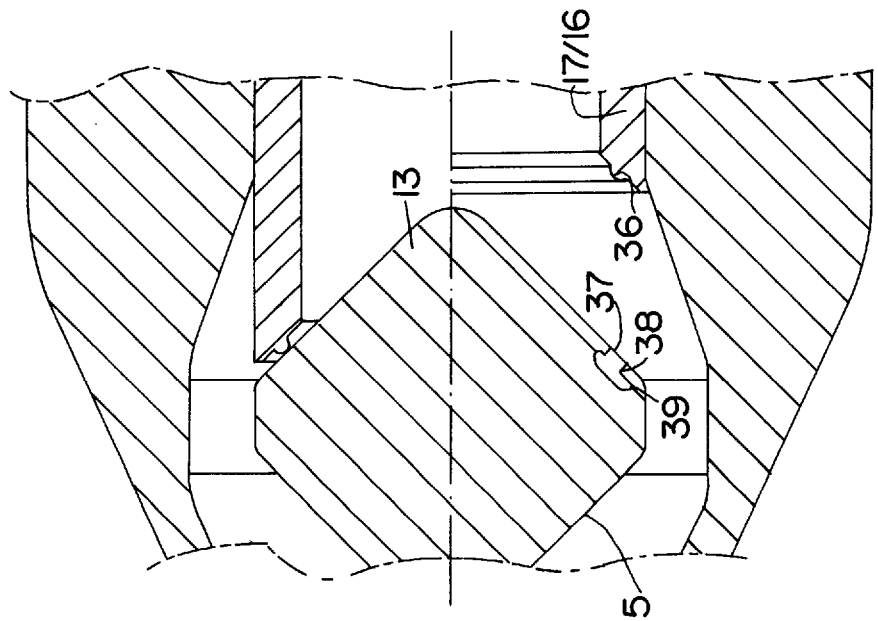
FIG. 3 is a variant embodiment of the sealing part of the valve shown in FIG. 1, in an enlarged partial section.

Another embodiment of the cutting off of the flow is shown in FIG. 3. In that case, an end 36 of the slide sleeve 17 presses in sealing manner against a sealing surface 37 arranged obliquely in radial direction on the flow-impact part 13. The sealing surface 37 is arranged on a packing 38 of elastomer, thermoplastic or polytetrafluorethylene which is preferably clamped fast in a recess 39 in the flow-impact part 13 of the flow body 5 or attached thereto by injection.

In the event of lesser demands on the tightness of the valve, the slide sleeve 17 can seal off directly with the end 36 on the conical wall surface 35.

Figure 4:
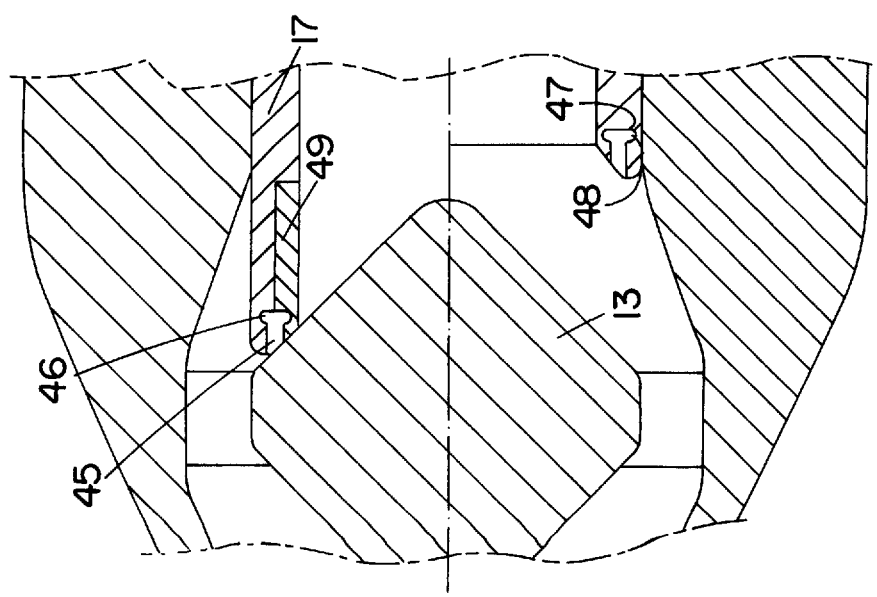
FIG. 4 shows another embodiment of the sealing part of FIG. 4.

FIG. 4 shows another possibility of sealing off the flow channel 4.

On the end of the slide sleeve 17 there is arranged a packing 45 which has a bead 46 on one end and is made of elastomer or polytetrafluorethylene and arranged in a recess 47. The recess 47 has undercuts 48, into which the bead 46 the packing 45 is inserted in order to hold the packing 45 axially.

The packing 45 can be held in position by injection, gluing or pressure.

As shown in the upper part of FIG. 4, the slide sleeve 17 can be developed in two parts at its end so that the packing 45 can be introduced between an inner part 49 and the slide sleeve 17. In this case also, the bead 46 of the packing 45 is held in undercuts 48. The slide sleeve 17 and the inner part 49 are firmly attached to each other, for instance by a thread, bonding, pressure, or welding.

I claim:

1. A valve which allows for two-direction flow comprises:
   a housing, said housing defining an axial flow channel and a cylinder chamber wherein the cylinder chamber is a lateral extension of the axial flow channel;
   a reciprocal hollow closure member disposed within said axial flow channel, said closure member having piston means mounted thereon and received in said cylinder chamber for reciprocating said closure member;
   seal means mounted on said housing defining said axial flow channel on either side of said cylinder chamber for sealingly mounting said closure member in said axial flow channel and at the same time sealing said cylinder chamber from said axial flow channel;
   a stationary flow control means having substantially identical opposed flow impact surface configurations which allows for two-directional substantially linear flow within said axial flow channel under substantially similar conditions wherein the flow control means is arranged within the axial flow channel, so as to allow for a substantially constant flow characteristic gradient at all positions of the closure member between 5% and 100% open, said flow control means having a recess for receiving a flow impact means, said flow impact means having (1) a stem portion received within said recess, (2) a conical shaped impact surface of desired configuration to obtain desired flow characteristics and (3) an annular conical packing sealing surface adjacent said impact surface; and
   drive means for displacing said piston means and correspondingly said closure member in an axial direction for selectively sealing and unsealing said closure member on said packing sealing surface of said flow control means.

2. A valve according to claim 1 wherein the flow control means is fixedly attached to the housing.

3. A valve according to claim 1 wherein the closure member is in the form of a hollow sleeve which forms a flow channel and is displaceably mounted in the housing wherein a portion of the hollow sleeve seals on said packing sealing surface of the flow control means.

4. A valve according to claim 1 including a rod fastened on the piston means wherein the rod, in the closed position of the valve, extends out of a bore in the housing and forms a valve-position indicator which serves as signal generator for the position of the valve.

5. A valve according to claim 1 wherein the force of the drive means necessary for displacement of the closure member is substantially independent of the pressure of flow fluid.

6. A valve according to claim 1 wherein the hollow closure member is mounted in bearing parts in the housing which are provided with a sealing arrangements including at least two packings with a leakage hole arranged therebetween.

* * * * *